Inventor:
ALFRED HEIDT
BY Robert H. Jacob
AGT

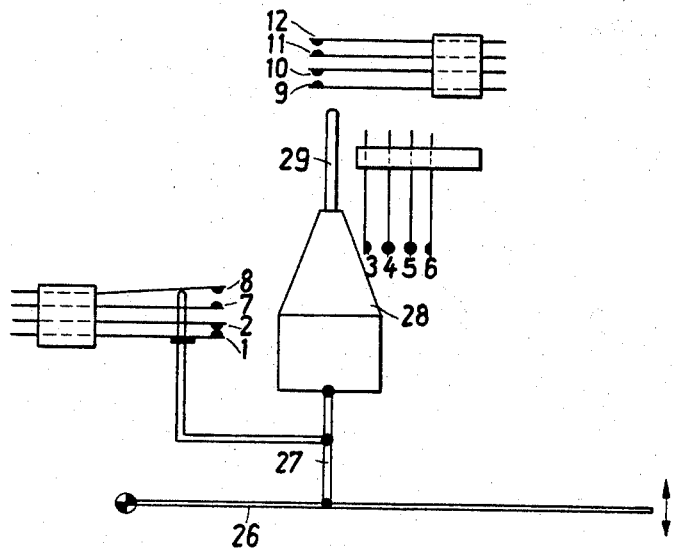

United States Patent Office 3,407,910
Patented Oct. 29, 1968

3,407,910
METHOD AND MEANS FOR THE AUTOMATIC STOPPING OF AN ELECTRIC DRIVING ARRANGEMENT IN A PREDETERMINED POSITION, PARTICULARLY FOR SEWING MACHINES
Alfred Heidt, Schwetzingen, Germany, assignor to Frankl & Kirchner Fabrik für Electromotren und Elektrische Apparate, Baden, Germany, a firm
Filed May 21, 1966, Ser. No. 553,801
Claims priority, application Germany, May 28, 1965, F 46,179; Mar. 16, 1966, F 48,667
14 Claims. (Cl. 192—18)

ABSTRACT OF THE DISCLOSURE

Apparatus for the automatic stopping of a driven machine part such as a sewing machine in a predetermined position, where the coupling and the brake operate simultaneously under control of transistorized circuitry including a brake transistor and a coupling transistor and a generator which supplies potential thereto, where alternate heavy braking and reacceleration are avoided in that as the speed increases, the generator supplies higher potential so that the brake transistor remains effective and increases the braking effect.

---

Figure 1:
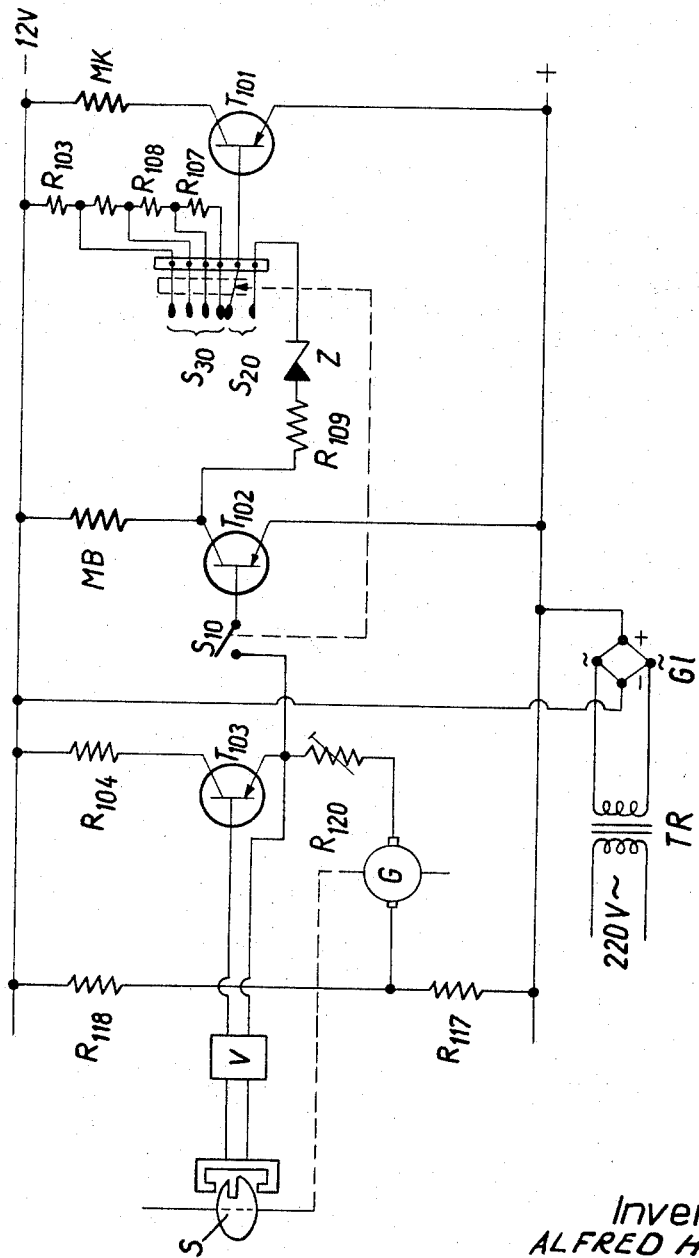

The invention relates to automatic control means and is particularly concerned with a method for the automatic stopping in a predetermined position of an electric driving arrangement especially for sewing machines as well as suitable means therefor.

The invention is based on an electric driving arrangement or assembly with an electrically controllable coupling connected between a continuously rotating drive motor and the driven part and an electrically controllable brake, where the coupling which is in the form of an electromagnetic friction coupling and the brake are controlled by way of one or more transistors in a manner that the control means that must be actuated for stopping the drive, as well as the switch member which determines the stopping position are located in the control circuit, and the energizing coils of the coupling and of the brake are located directly in the operating circuit of the transistors. When the drive of the known driving arrangement is disconnected, very heavy braking takes place and, subsequently, the entire machine is again accelerated by sensitizing the winding of the coupling. In this connection the acceleration may increase to such an extent that during the next passage of the machine component to be stopped in a predetermined position, the proper switch member is unable to introduce a sufficient impulse for the stopping. Finally, the acceleration varies greatly as the coupling is restored due to the type of the material to be worked on, for example, in sewing machines, also the number of stitches, the width of the stitches or the like, and produces different acceleration factors with different working operations. Owing to these circumstances, there existed the danger of repeatedly passing over the stopping position, or it was only possible to attain relatively small stopping accuracy.

The problem on which the invention is based is to provide a method and a suitable arrangement or means where the alternate heavy braking and the re-acceleration is avoided, and by means of which increased stopping accuracy may be obtained.

In accordance with the invention this problem is solved in that in a method for the automatic stopping of an electric driving arrangement of the type explained above, the transistor which controls the brake excitation during disconnecting is cut out on the one hand by a control potential which becomes effective depending on the position of an element of the machine, and additionally by a control potential that depends on the speed of rotation, in such a manner that the control potential which depends on the speed of rotation effects a brief continued or further running of the drive at a constant predetermined low speed of rotation until by means of the transistor the control potential that depends on the position permits the brake to become fully operative and thereby puts the drive at rest. This results in that over-running of the corresponding machine part beyond the stopping position no longer becomes harmful, and thus it can be furthermore accomplished that the contact arrangement which controls the braking operation can be substantially decreased in size by the switch member that produces the control potential that depends on the position. It is now possible to adjust to a low velocity that remains even, and which is chosen in such a manner that also with small contact dimensions of the aforementioned control component a safe stopping is made possible. A further advantage resides in that the coupling can now be set so firmly that it is sufficient for all possible situations that may arise, i.e., a very strong moment of rotation exists also during the continued running.

The arrangement for carrying out the method in accordance with the invention comprises an electric drive means with a coupling in the form of an electromagnetic friction coupling connected intermediate a continuously running drive motor and a driven part, and an electrically controlled brake as well as one or more transistors, where the control means to be operated for stopping the drive as well as a switch means that depends on position, which is known per se, connects a transistor as the predetermined position of the drive is reached, are located in the control circuit, and the inductance coils of coupling and brake are directly in the operating circuit of the transistors, and where in accordance with the invention a generator which is preferably operated in common with the switch means that depends on position (synchronizer) and a transistor controlled by the synchronizer are arranged in the base circuit of the transistor that controls the sensitizing of the brake.

By means of this arrangement it is accomplished that when the drive is rendered inoperative, first the speed of rotation is slowed down by the brake to a predetermined amount and that this speed of rotation is maintained so long until an impulse of the synchronizer renders the transistor that controls the brake sensitizing fully operative, and thus also the brake is fully sensitized so that the machine is stopped in the desired position.

After the stopping of the machine the arrangement in accordance with the invention effects that the brake sensitizing remains effective in the predetermined position. This makes manual turning that is occasionally desired difficult, and in certain cases impossible.

In accordance with a further development provided by the invention the problem is solved of further improving the effectiveness of the arrangement in accordance with the invention in a manner that a further adaptaion of the circuit arrangement in accordance with the invention to the different problems and operating conditions during stopping of electric drives is satisfied, particularly in sewing machines. This is achieved by the further development of the invention in that for releasing the brake a relay which operates with a delay is arranged in the circuit between the brake transistor and brake sensitizer. This results in that after stopping the machine and terminating the disconnecting delay, the relay opens the connection to the brake transistor, and thus releases the brake. Thus, the machine can now be moved on manually, for example, by means of a balance wheel.

In accordance with a further development of the invention, the base of the transistor which sensitizes the coupling can be connected by way of a series circuit of a resistor and Zener diode with the emitter circuit of the transistor that controls the sensitizing of the brake.

By means of this coupling of the transistor which controls the sensitizing of the coupling with the brake transistor, it is insured that the adjustable speed of rotation is kept constant.

As synchronizer, an inductive control head having a stationary winding and known per se is used, with a control disk connected with a machine part which has a control sector without contacts. By means of the arrangement in accordance with the invention, the contactless sector of the control disk can in an advantageous manner be proportioned so small that a stopping operation is attained with ±3° accuracy.

It is advantageous to provide a transistor amplifier known per se for the control impulse potential supplied by the synchronizer. In accordance with a further feature of the invention it is possible to coordinate switching means for temperature compensation known per se with one, or several, or all control transistors. For adjustment of the constant predetermined low speed of rotation that is desired, a variable resistor is suitably used.

In an advantageous embodiment of the invention, the generator is connected to the potential source by way of a potential divider.

A particularly suitable construction is obtained if the rotor of the generator is fastened to the shaft of the machine on which also the control disk of an inductive control head is arranged. With such a design of the arrangement in accordance with the invention, the winding of the generator can be arranged over this machine shaft so that a compact wear-resistant construction is obtained.

In the arrangement in accordance with the invention a so-called thread cutter can be connected. In individual types of thread cutters, movement of the corresponding part of the machine is necessary in order to actuate the thread cutter. Also here the maintaining of the brake sensitizing after stopping of the machine would not interfere. The circuit in accordance with the invention also provides the possibility that with the relatively rugged change from the normal speed of rotation to the predetermined low speed of rotation during the stopping operation, there develops an over-running of the control so that braking to zero takes place without reaching the predetermined position and without subsequent re-acceleration being necessary.

For actuating a thread cutter there is additionally provided a relay, the sensitizing of which is controlled by the sensitizing of the brake. In this manner it is accomplished during the actuating that the thread cutter first remains ineffective until the corresponding relay is sensitized under control of the brake sensitization and also sensitizes the thread cutter magnet. Thus, independently of the time period of the actuation of the thread cutter, the actual operation of the cutting takes place only after stopping of the machine.

A further advantageous embodiment of the invention is obtained when the aforementioned relay is connected with a second relay in a "plus" circuit in a manner that sensitizing can take place only when the stopping of the machine has taken place in the upper dead-point position of the needle. If a thread cutter is used that is controlled by way of cam disks, then a rotation of the machine is necessary for its operation. The use of such thread cutters is made possible by a further improvement in accordance with the invention, in that an additional relay is provided for disconnecting the control heads which effects the sensitizing of the winding of the coupling for further turning of the machine by one rotation, in which connection furthermore an R-C member is provided for desensitizing this relay so that after execution of the stopping and of the cutting operation, the control heads are again connected.

A particularly suitable form of the subject of the application is obtained in that optionally different operating velocities can be set up. This is obtained in that the circuit of the transistor which controls the sensitizing of the brake reversible resistance arrangements are provided for setting the pre-selectable velocities of rotation.

For flattening the changeover mentioned above from the normal speed of rotation to the predetermined low speed of rotation, the invention provides furthermore that a control member is arranged in the collector circuit of the transistor that controls the brake sensitizing, which is preferably an R-C member. The effect of this control member brings about a softer course of the brake operation and speeds up the stopping in that one rotation which becomes necessary when the stopping operation is started shortly after the passing of the machine through a still-stand position, does not have to take place during the entire time period at the predetermined low speed of rotation, but that at the beginning of the action one part of this rotation still takes place at the higher speed of rotation, for example, twice or three times the number of remaining rotations.

A particularly advantageous effect is obtained if the threshold potential of the transistor which controls the sensitizing of the brake is set higher than the threshold potential of the transistor controlling the sensitizing of the coupling. In this manner it is obtained that with the change of the speed of rotation in the machine, first only the sensitizing of the coupling is reduced, and only with considerable fluctuations of the speed of rotation of the machine, the brake sensitizing becomes effective.

In a preferred embodiment of the invention the control operations take place by means of a set of contacts which are operated with a pedal-actuated operating device. By means of this arrangement it is accomplished that the entire contact arrangement can be accommodated in a portion of the pedal control. This arrangement in accordance with the invention makes it possible that the set of contacts is constructed in the form of contact groups which are operable by means of mechanical setting elements that become effective in timed sequence one after the other and which are associated with the individual groups of sets of contacts.

Figure 2:
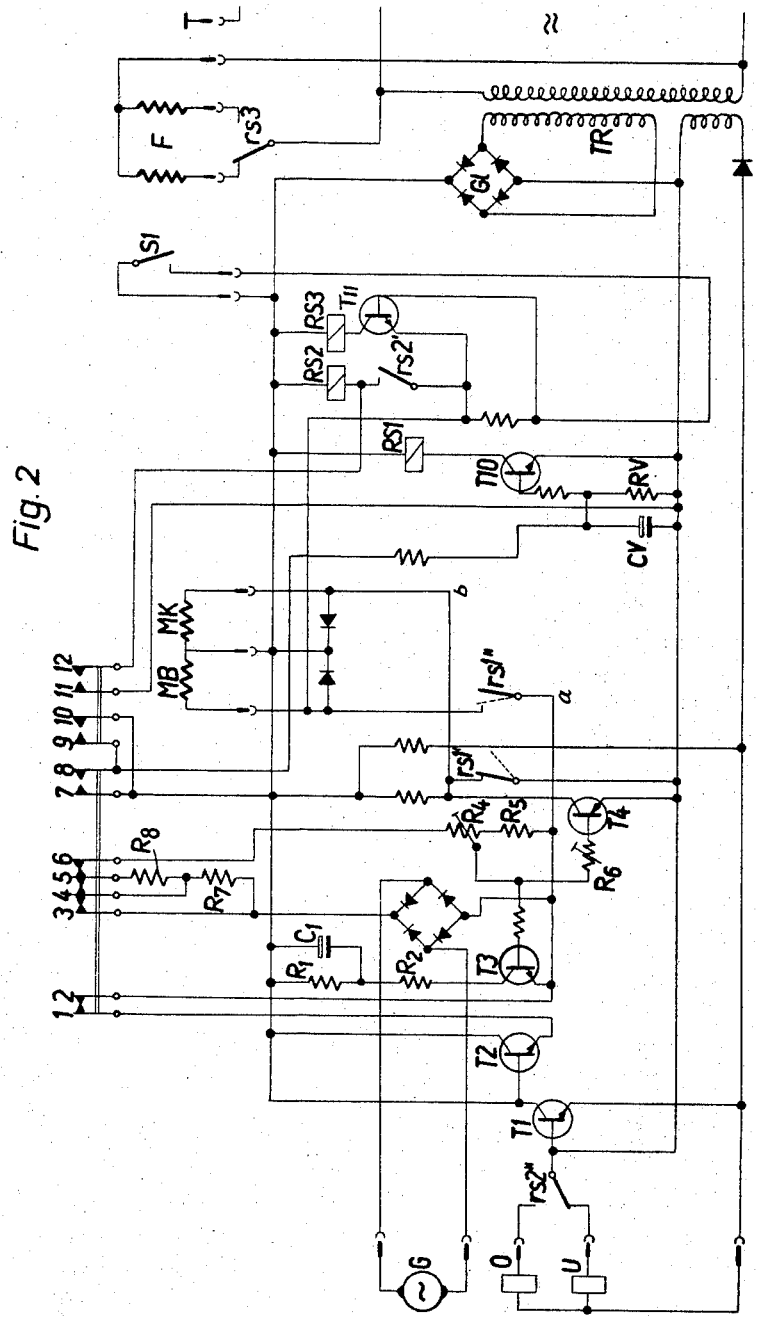
Figure 3:
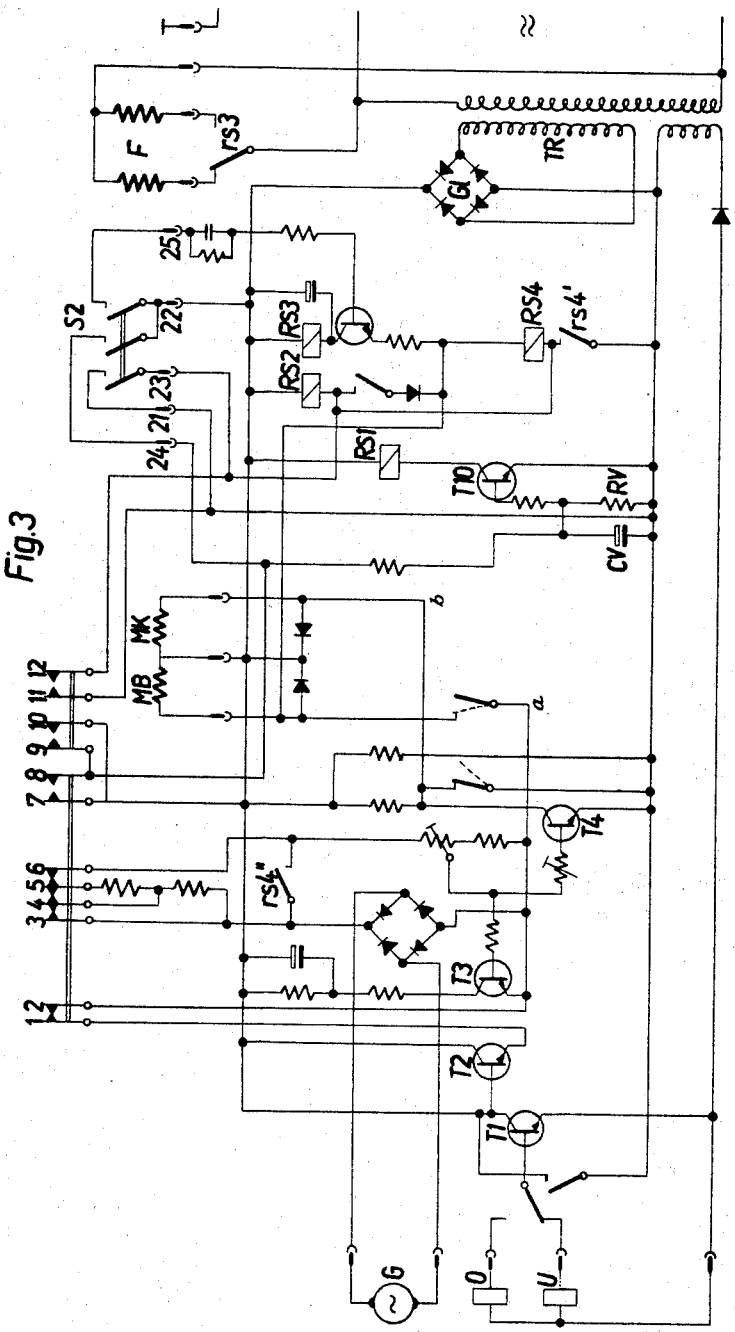

Further details and advantages of the invention will become apparent by reference to the drawings which schematically illustrate embodiments of the invention. The necessary switch elements which do not constitute a part of the invention have been omitted. In these drawings, FIG. 1 is a first embodiment of the arrangement in accordance with the invention, FIG. 2 shows a second embodiment, FIG. 3 is a modified embodiment in accordance with FIG. 2, and FIG. 4 is an embodiment of the operating arrangements for the groups of contacts.

In the arrangement in accordance with the invention, magnet windings MK and MB are provided for operating the coupling or the brake, respectively. In the embodiment in accordance with FIG. 1, the coupling winding MK is controlled by way of transistor $T_{101}$ and the brake winding MB by the transistor $T_{102}$.

The arrangement is fed from the AC line circuit by way of a transformer TR and a rectifier bridge G1 with DC potential. The sensitizing of the magnet coupling during the operation is controlled by adjustment of the base current of the transistor $T_{101}$ with the aid of a switch $S_{30}$. This switch $S_{30}$ can be installed in a pedal control device in a manner known per se and can be operated like a pedal starter. A further switch $S_{10}$ is associated with an end switch $S_{20}$. The end switch $S_{20}$ separates the base of the transistor $T_{101}$ from the velocity control switch $S_{30}$ and connects it by way of a Zener diode Z and a resistor $R_{109}$ with the collector of the transistor $T_{102}$.

With the switch $S_{10}$ closed, a control potential is fed to the base of transistor $T_{102}$ which is composed of an impulse supplied by the control head S and amplified in a transistor amplifier V known per se, which renders transistor $T_{103}$ conductive and a control potential supplied by a generator G. The generator G in this case is connected with the base current circuit of the transistor $T_{102}$. In the embodiment illustrated this generator G is connected by way of the potential divider $R_{117}$ and $R_{118}$ to the potential supply source. In the lead to the generator a control resistor $R_{120}$ may be provided.

The control head S may be in the form of an inductive impulse source which has a control fork through which passes a disk having a control cut-out. As soon as the cut-out passes through the control fork, an impulse is supplied by the control head S.

The operation of the illustrated circuit arrangement in accordance with the invention is as follows: The switches $S_{20}$ and $S_{30}$ are open during the working operation, i.e., the entire brake side with the transistor $T_{102}$, the magnet winding MB, and the control arrangement is no longer effective on the operation of the machine by way of the coupling. The base of the coupling transistor $T_{101}$ is now connected to a negative potential by way of a resistor $R_{107}$ or $R_{103}$, or eventually still more such resistors, and can now be optionally controlled in accordance with the contact operation, i.e., corresponding to the resistors $R_{107}$, $R_{108}$ that may be in the circuit, whereby also the sensitizing of the winding MK changes correspondingly and thus the coupling forces. This means that with this arrangement the velocity of the machine can be controlled. If the operation is now terminated and disconnecting takes place, then the switch $S_{30}$ is opened and the switches $S_{10}$ and $S_{20}$ are closed. Advantageously, this is done by releasing the foot pedal control. Thus the base of the coupling transistor $T_{101}$ is separated from the resistors $R_{107}$ and $R_{103}$, i.e., from the negative potential, and connected by way of a series circuit including Zener diode Z and a resistor $R_{109}$ to the collector of the brake transistor $T_{102}$. Besides, its base is connected to the emitter of a transistor $T_{103}$ and simultaneously to a generator G.

At the moment of braking the machine is still running at the full speed of rotation, i.e., the generator delivers a relatively high potential and thus controls the transistor $T_{102}$, i.e., the brake transistor. The brake therefore is now fully connected. Thus the speed of rotation is reduced to a value that may be preset, for example 200 r.p.m. When this value is reached, then the synchronizer S which consists of an inductive position setter causes the transistor $T_{103}$ to be fully operated, when the position of the machine part to be stopped in a predetermined position has been reached just at that moment, so that thereby also the transistor $T_{102}$, i.e., the brake is sensitized which then holds the machine in tis position. If at this point the desired final position has not yet been reached, then the synchronizer supplies no impulse, i.e., the transistor $T_{103}$ is not actuated, and the generator G now holds the speed of rotation at the predetermined value, for example 200 r.p.m. This takes place in the following manner: When the speed of rotation tends to increase above this predetermined value, then the generator by supplying a correspondingly higher potential at this higher speed of rotation continues to control the transistor $T_{102}$ so that the braking effect is increased. Simultaneously the transistor $T_{101}$ is more strongly influenced in such a manner by way of the coupling $R_{109}$ and Z that the coupling effect is reduced. As soon as the speed of rotation tends to drop below the value of, for example 200 r.p.m., the reverse action takes place. Then the transistor $T_{102}$ is more strongly closed, i.e., the braking sensitization is reduced and the transistor $T_{101}$ is more strongly controlled by way of the coupling $R_{109}$ and Z, so that the sensitizing of the coupling is also increased. In this manner the predetermined number of rotations is held constant. This control operation, or the continued running of the machine at the constant remaining speed of rotation, will now continue until the inductive source of the synchronizer S supplies by way of transistor $T_{103}$ a corresponding control impulse for the transistor $T_{102}$ which actuates the transistor completely and permits the magnetic brake to become fully effective, so that the machine is braked to stand still at this end position. The arrangement is such that with the brake winding MB fully energized, the magnetic coupling becomes completely ineffective.

As a result, over-running of the synchronizer no longer can take place. The contactless recess of the disk of the inductive source which may be connected with an arm shaft can be decreased, so that now a stopping accuracy can be attained with a tolerance of $\pm 3°$. In arrangements of the prior art, for stopping a drive in predetermined position, it was necessary to have the recess in the contact disk of the inductive source larger, so that with too large a predetermined low speed of rotation no over-running takes place and disconnecting is not effective at all. By means of the invention it is made possible to terminate the stopping operation at least after one rotation. The velocity which in accordance with the invention is adjustable, and which is low and remains even, also effects that with the small contact cut-out in the impulse disk of the inductive source, safe stopping is made possible. The resistor $R_{120}$ can also be in the form of a constant resistance or a trimmer which is set initially for a predetermined operating purpose.

The potential divider $R_{117}$ and $R_{118}$ affords the possibility of raising the base of the transistor $T_{102}$ to a predetermined potential as the braking operation is initiated so that this transistor is actuated to a smaller extent, and thus a pre-magnetizing is automatically accomplished for the brake magnet MB. This pre-magnetizing, however, does not arise during the normal working operation when the switch $S_{10}$ is open. The pre-magnetizing is especially advantageous because the circuit which is rather sensitive operates with such a small delay that the braking might, in a given case, follow the semi-waves of an AC generator G which then could result in noises. It is therefore advisable to use a direct current generator as generator G.

In the practical embodiment of the arrangement in accordance with the invention where an AC potential generator may be used, the rotor of the generator G is secured to the shaft of the machine on which also the contact disk of the control head S with the inductive source is arranged. Then the generator winding can be wound on a stationary coil which encompasses the shaft, and due to this mechanical operation no wear effects arise. The relatively high potential supplied by the generator G at the beginning of the braking operation, as a result of the still existing high speed of rotation, is not harmful for the transistor $T_{102}$. At first the brake MB is strongly excited, but on the other hand a potential limitation occurs automatically as a result of auxiliary resistor $R_{120}$ and the base diode of the transistor $T_{102}$. Therefore, at the base of the transistor $T_{102}$ there arises only the required potential for actuating the transistor which is of the order 0.5 v. The rest drops across the resistor $R_{120}$ so that independently of the speed or rotation, i.e., independently of the magnitude of the potential supplied by the generator, there exists no danger of a potential break or short across the transistor $T_{102}$.

Advantageously the entire control device is combined with the motor to form a structural unit.

In the embodiments in accordance with FIGS. 2 and 3 the winding of the coupling MK is controlled by the transistor $T_4$ and the brake winding MB by the transistor $T_3$.

The sensitizing of the magnet coupling MK during the operation is controlled by controlling the base current of transistor $T_4$. For this purpose the base of the transistor $T_4$ is supplied with a potential that is composed of an impulse supplied by the control head O or U, and amplified at the transistor amplifier $T_1$, $T_2$, known per se, and on the other hand a potential supplied by the generator G.

The control heads O, U may be in the form of inductive impulse sources through the control fork of which passes a disk having a control cut-out. As soon as the cut-out passes the control fork, an impulse is supplied by the associated control head.

In the actuating part the contacts 1–2, 3–4, 5–6, 7–8, 9–10 and 11–12 are provided. A relay $RS_1$ may be sensitized across contacts 7-8, if required. This relay controls contacts $rs1'$ in the circuit of the sensitizer of the magnet coupling MK and in the opposite sense a contact $rs1''$ in the control circuit of the brake sensitizing MB.

The relay $RS_1$ has a switch delay means comprising a transistor $T_{10}$ and an R-C member RV–CV.

In the collector circuit of the brake transistor $T_3$, an additional RC control member $R_1$–$C_1$ is located for flattening out the braking changeover. A relay $RS_2$ controlled across contacts 11–12 switches the contacts $rs2'$ and $rs2''$. By means of this relay a switching of the control heads from a lower holding position to an upper holding position and vice versa is made possible.

A further relay $RS_3$ under control of transistor $T_{11}$ actuates a magnetic thread cutter F which is supplied with the normal line potential. Such an operation is initiated by means of a switch S–1.

The switchable resistance arrangement $R_7$ and $R_8$ serves for the optional setting of a predetermined working speed. The operation of the arrangement in accordance with FIGS. 2 and 3 is explained below with reference to the individual operating conditions.

First a slow speed stage is set up for which the contacts 1–2, 9–10, 11–12 are open and contacts 3–4, 5–6, 7–8 are closed. Since the contacts 1–2 are open, the control heads O, U are separated from the other parts of the circuit by the transistors T1 and T2. The generator G produces a potential which is applied to a potential divider consisting of resistors $R_4$ and $R_5$. A potential is picked up at potentiometer $R_4$ which causes the following: if the generator runs at the desired potential, transistor T4 and thereby the coupling is operated at a certain output strength by the way of $R_6$. The transistor T3 whose threshold potential is higher than that of transistor T4 is not operated so that the brake is not sensitized. The contacts $rs1''$ is closed at this time because the relay RS1 remains energized by way of closed contacts 7–8 and the transistor T10.

If the load on the machines is changed now, for example it becomes smaller, then the speed of rotation of the generator G increases and thereby also its output potential. The base of the transistor T4 is potentially increased which reduces the energization of the coupling. In the event that the speed of rotation increases considerably, then also the potential threshold at the transistor T3 is exceeded and the brake is made operative. This results in the machine returning to the preset speed of rotation.

If the conditions are reversed, when the speed of rotation decreases by increasing the load, the potential of the transistor slides downwardly immediately, the brake is deenergized and the coupling effect is increased until the former condition is again reached.

In this manner the arrangement in accordance with the invention provides an automatic self-control of the speed of rotation corresponding to the existing load conditions whereby the speed of rotation is maintained constant.

If the slow stage 2 is now switched on, then the contacts 1–2, 3–4, 9–10, 11–12 are open and contacts 4–5–6–7–8 are closed.

The operation now is the same as that described above, except that connecting the resistor $R_7$ into the potential divider circuit the basic potentials are changed and thereby also the speed of rotation.

In a further slow stage the contacts 1–2, 3–4–5, 9–10, 11–12 are opened while the contacts 5–6, 7–8 are closed. Also in this case a further potential displacement occurs due to the addition of the resistor $R_8$, so that in this position a third speed of rotation is obtained, which is maintained constant as previously described.

When setting the circuit for the full operating speed contacts 1–2, 3–4–5–6, 9–10 and 11–12 are open while contacts 7–8 remain closed. With this contact setting the generator potential is entirely separated from the potential divider by the opening of the contacts 5–6. The transistor T4 is blocked and thus the coupling is completely energized. The transistor T3 is likewise blocked so that no energizing current is supplied to the brake. Thus in this condition the coupling is completely connected and the machine runs at its highest speed of rotation.

When the machine is stopped, the contact setting illustrated in FIG. 2 is obtained.

The disconnecting delay by the way of transistor T10 and the RC component RV–CV results in contact $rs1''$ remaining closed, although contacts 7–8 are open. The generator which runs at the high speed of rotation, supplies a correspondingly high potential, which unblocks transistor T4 and renders transistor T3 fully operative. As a result a strong current impulse now flows momentarily by way of the RC component R1, C1 in the collector circuit of transistor T3 which completely energizes the brake by way of T3. As the braking operation is initiated T3 is made fully operative because the capacitor C1 is not as yet charged. Therefore also the brake is fully energized. By virtue of a suitable time constant of the RC component the condenser C1 is completely charged, resistor T1 becomes effective and the transistor T3 is no longer fully operative. As a result the braking effect is decreased.

Under the most unfavorable conditions, for example when a slot of the brake member U or O has just passed the head, the machine continues to run at a higher speed, so that the total braking time is decreased. A further advantage of the RC control component in the collector circuit of transistor T3 is that over-running of the machine is prevented. Without the control component in the collector circuit of transistor T3 it could happen that the braking to zero takes place and reacceleration of the machine is necessary. Such a phenomenon is avoided in accordance with the invention by the insertion of the RC control component. This control component is so constituted that after a predetermined time period, i.e., when the speed of rotation of the machine has dropped to approximately one-third of its maximum value, the actuation of the brake operation is somewhat decreased. This results in the speed of rotation decreasing linearly, depending on the time, to only one-third of its value and then adjusts along a soft curve to a speed of rotation, which is determined by the potential thresholds set up at the potential divider R4, respectively resistor R6. If the desired stopping position is now reached at a point, i.e., when the control head U becomes effective, then the brake is again fully energized by way of transistors T1 and T2 and the machine is held in this position. The remaining number of rotations is maintained until the brake head responds, i.e., until the desired stopping position is reached.

Thus the RC control component provides for a smoother course of the braking operation and also provides advantages with respect to time, in that the one rotation which in the most unfavorable case must still take place does not occur during the entire time at the low remaining speed, but a part of this rotation at the beginning of the operation still takes place at speeds of rotation that are two or three times that of the predetermined low speed of rotation.

When the machine is stopped, the relay RS1 releases, opens contact rs1" and thus releases the brake. Thus the machine can optionally be further turned, for example manually.

In order to lock the coupling side safely the contact rs1' is now closed.

If a different stopping position has been set up, then all contacts are closed and in this manner the second control head O is made effective. The further running and the braking operation take place as previously described.

Furthermore a relay RS3 is provided which actuates a magnetic thread cutter F which can be supplied with the normal line current. A switch S1 is provided for actuating the thread cutter. The structural components are built into the circuit in such a manner that the relay R3 can only respond, and that with a delay, when the brake is completely energized and control head O is operative. This means that the thread cutter can only be actuated when the upper needle position is reached and the machine is standing still.

The thread cutter may be a device, known per se, which is so connected with the stopping means that cutting is possible only when the needle is in the upper position. However, in accordance with the invention it becomes possible that the operation may take place at any time but is initiated only when the machine is standing still in the desired position.

The embodiment in accordance with FIG. 3 differs from the embodiment in accordance with FIG. 2 only in the thread cutter actuating circuit. For if thread cutters are used which are actuated by means of curved bars, it is necessary for the machine to make a complete rotation from the top stopping position and during the required time the operation of the thread cutter takes place mechanically.

In order to adapt the thread cutter operating means to such thread cutters an additional relay RS4 is provided.

The relays RS1 and RS2 are retained without change. The circuit for the magnet for the thread cutter is unchanged. Such a magnet is also required for this situation in order to cause the curve control to engage. In lieu of the release switch S1 a switching device is now provided, for example a knee switch S2. The description of the operation is again based on the condition that the machine is at a standstill. Contacts 22–24 as well as contacts 21, 23 and 22, 25, are closed. Relay RS1 is energized by way of closed contact 22–24 so that as before the brake is released. Relay RS2 is energized as before by the closed contacts 21, 23. Closed contact 22–25 actuates relay RS3. Since the brake is not energized, relay RS4 which is connected with the upper end of the brake winding is up and positive. Contact rs4' closes to the hold position. The base of transistor T2 is low by way of contact rs3. The control heads U and O are inoperative. Contact rs4 now also closes so that the machine can only operate at the lowest speed of rotation. The coupling becomes completely operative, the machine begins to run and makes one rotation. Relay RS3 now is released by the RC component RV–CV causing the control heads to become effective again. The aforementioned RC component thus avoids a continual starting of the machine for one revolution at a time.

FIG. 4 illustrates schematically an operating device for contacts 1–12 where the contacts are subdivided into three contact groups, to-wit, groups 1–2, 7–8, 3–4–5–6 and 9–10, 11–12. The operation is effected by means of a lever 26 which is, for example, linked to a vertically displaceable part 27. Part 27 is provided with a conical control member 28. A contact plunger 29 is provided at the upper end. In the lowest position which corresponds to the sewing position, all contacts, except contacts 7–8, are open. In the center position which corresponds to the holding position "bottom" the contacts 1–2, 3–4–5–6 are closed and contacts 7–8, 9–10, 11–12 are open. With further upward movement the holding position "upper" is reached. In that event all contacts are closed.

By virtue of the oblique control surface of the control member 28 successive closing of the contacts 3–4, 4–5, 5–6 is obtained whereby it is possible to adjust to the different rotational speeds.

It can be seen from the illustration that contacts 1–2 and 7–8 open or close in the opposite sense, while contacts 9–10 and 11–12 open and close in the same sense while contacts 3–4, 4–5, 5–6 are closed or opened one after another.

The invention is not limited to the embodiments illustrated and described. It is also possible within the known art of circuitry and switching to provide the conventional switching devices for temperature and potential stabilization. Furthermore, an AC potential generator may be provided which requires the introduction of a DC rectifier bridge. The control of the brake and/or coupling energization can be provided by means of further transistor driving stages which would be connected at points $a$ and $b$ to the circuits in accordance with FIGS. 2 and 3.

Advantageously the invention comprises also partial and sub-combinations of the described and/or illustrated features. Furthermore, the invention is not only applicable to sewing machines but also for controlling machine tools of all types.

Having now described my invention with reference to the embodiments illustrated in the drawings, I do not wish to be limited thereto, but what I desire to protect by Letters Patent of the United States is set forth in the appended claims.

I claim:

1. A device for the automatic stopping of an electric driving assembly comprising an electrically controlled coupling including a first energizing coil and an electrically controlled brake including a second energizing coil, said coupling and brake being connected intermediate a continuously running motor and a driven portion, switching means for stopping the driven portion in a predetermined position including a switching device for determining the stopping position, wherein the coupling is in the form of an electromagnetic friction coupling, the coupling and the brake being controlled by a transistorized control circuit in which the switching means, switching device and first and second energizing coils are connected, said circuit also including a source of control potential depending on the speed of rotation of the driven portion, a first transistor causing said brake coil to be variably energized through said circuit and a second transistor causing said coupling coil to be variably energized through said circuit, said brake when energized effecting a retarding force on the driven portion, said coupling when energized drivingly engaging the motor with the driven portion, said control circuit causing said coupling and said brake to cooperate simultaneously to produce a brief continuous running of the driven portion at a constant remaining speed of rotation depending on said control potential, and said transistorized control circuit containing a control potential which depends on the position of said driven portion part and which causes said circuit to deenergize said coupling and to actuate the brake to become fully effective to stop the driven portion.

2. Arrangement for the automatic stopping of an electric driving assembly comprising an electrically controlled coupling including a first energizing coil and an electrically controlled brake including a second energizing coil, said coupling and brake being connected intermediate a continuously running motor and a driven portion, said coupling being an electromagnetic friction coupling, switching means for stopping said driven portion in a predetermined position including a switching device for determining the stopping position, a transistorized control circuit for said coupling and said brake in which said switching means, said switching device and said first and second energizing coils are connected, and a source of control potential depending on the speed of rotation of said driven portion, said transistorized control circuit including a brake transistor controlling the energizing of said brake coil and a coupling transistor simultaneously controlling the energizing of said coupling coil, said arrangement further including a synchronizer and a generator, a synchronized transistor connected to and controlled by said synchronizer, and said brake transistor having a base circuit controlled by said synchronizer, said generator and said synchronized transistor.

3. Arrangement in accordance with claim 2 including a relay having a time delay means connected between said brake transistor and said second coil, and a contact switch in series with said second coil and actuated by said relay to interrupt the current from said brake transistor.

4. Arrangement in accordance with claim 3, where said synchronizer comprises an inductive control head, known per se, and a control disk connected to a machine component and having a contactless control sector.

5. Arrangement in accordance with claim 4, where said contactless sector is proportioned to provide for a stopping accuracy of substantially ±3°.

6. Arrangement in accordance with claim 2, including a variable resistor connected between said generator and the base of said brake transistor operative to adjust the constant predetermined low speed of rotation.

7. Arrangement in accordance with claim 2, including a potential divider connected across the generator circuit.

8. Arrangement in accordance with claim 2, where said driven portion has a shaft and said generator has a rotor mounted on said shaft, and said control disk of said inductive control head is mounted on said shaft.

9. Arrangement in accordance with claim 4, comprising a thread cutter supplied with line current for operation and a thread cutter relay for said thread cutter connected to the circuit of the brake transistor of said second energizing coil.

10. Arrangement in accordance with claim 9, comprising a further relay in "plus" connection with said thread cutter relay in a manner that said thread cutter is operative only with the driven portion in the upper stopping position.

11. Arrangement in accordance with claim 10, including a control head relay operative to disconnect said control head and energize said coupling for advancing the driven portion by one rotation and an RC component operative to de-energize the thread cutter relay and reconnect said control heads.

12. Arrangement in accordance with claim 2, including an RC control component in the collector circuit of the brake transistor circuit.

13. Arrangement in accordance with claim 2, where said brake transistor has a threshold potential greater than that of the coupling transistor.

14. Arrangement in accordance with claim 2, including a set of contacts arranged in contact groups and sequential mechanical setting means operative to actuate said individual contact groups.

References Cited
UNITED STATES PATENTS

| | | | |
|---|---|---|---|
| 3,258,629 | 12/1967 | Bono | 192—144 X |
| 2,816,635 | 12/1957 | Danly | 192—144 |
| 3,157,261 | 11/1964 | Bono | 192—18.2 |
| 3,160,128 | 12/1964 | Heidt | 192—18.2 |
| 3,268,047 | 9/1966 | Grygera | 192—144 |

MARTIN P. SCHWADRON, *Primary Examiner.*

C. LEEDOM, *Assistant Examiner.*